United States Patent [19]

Cormack

[11] Patent Number: 4,694,229
[45] Date of Patent: Sep. 15, 1987

[54] SERVO POSITIONING SYSTEM

[75] Inventor: Robert J. Cormack, Edinburgh, Scotland

[73] Assignee: Ferranti, plc, Cheshire, England

[21] Appl. No.: 796,217

[22] Filed: Nov. 8, 1985

[30] Foreign Application Priority Data

Nov. 9, 1984 [GB] United Kingdom ............... 8428414

[51] Int. Cl.$^4$ ............................................. G05B 13/00
[52] U.S. Cl. ..................................... 318/561; 318/618; 318/611
[58] Field of Search ................ 318/561, 618, 592, 611, 318/593, 594

[56] References Cited

U.S. PATENT DOCUMENTS 4,188,098 12/1984 Shimonou ........................... 318/561
4,473,786 9/1984 Miyashita et al. .................. 318/561
4,506,321 3/1985 Comstock et al. ............. 318/561 X
4,558,265 12/1985 Hayashida et al. ............ 318/618 X

FOREIGN PATENT DOCUMENTS 1489302 1/1975 United Kingdom .
1572066 8/1977 United Kingdom .
2133179 11/1983 United Kingdom .

Primary Examiner—Benjamin Dobeck
Attorney, Agent, or Firm—Kerkam, Stowell, Kondracki & Clarke

[57] ABSTRACT

A feedback servo positioning system for motor 13 is configured under the control of microprocessor 27 either as a position feedback servo for small displacement demands or an acceleration feedback servo for large displacements. In the latter role, the processor determines an intermediate position (e.g. mid point), accelerating the motor at maximum acceleration rate until the intermediate position is reached, and then calculates the deceleration rate required to stop the motor at the demand position. During deceleration the instantaneous position and velocity are monitored to update the optimum deceleration rate to compensate for variations from the initially computed value due to friction and other measurement errors.

13 Claims, 1 Drawing Figure

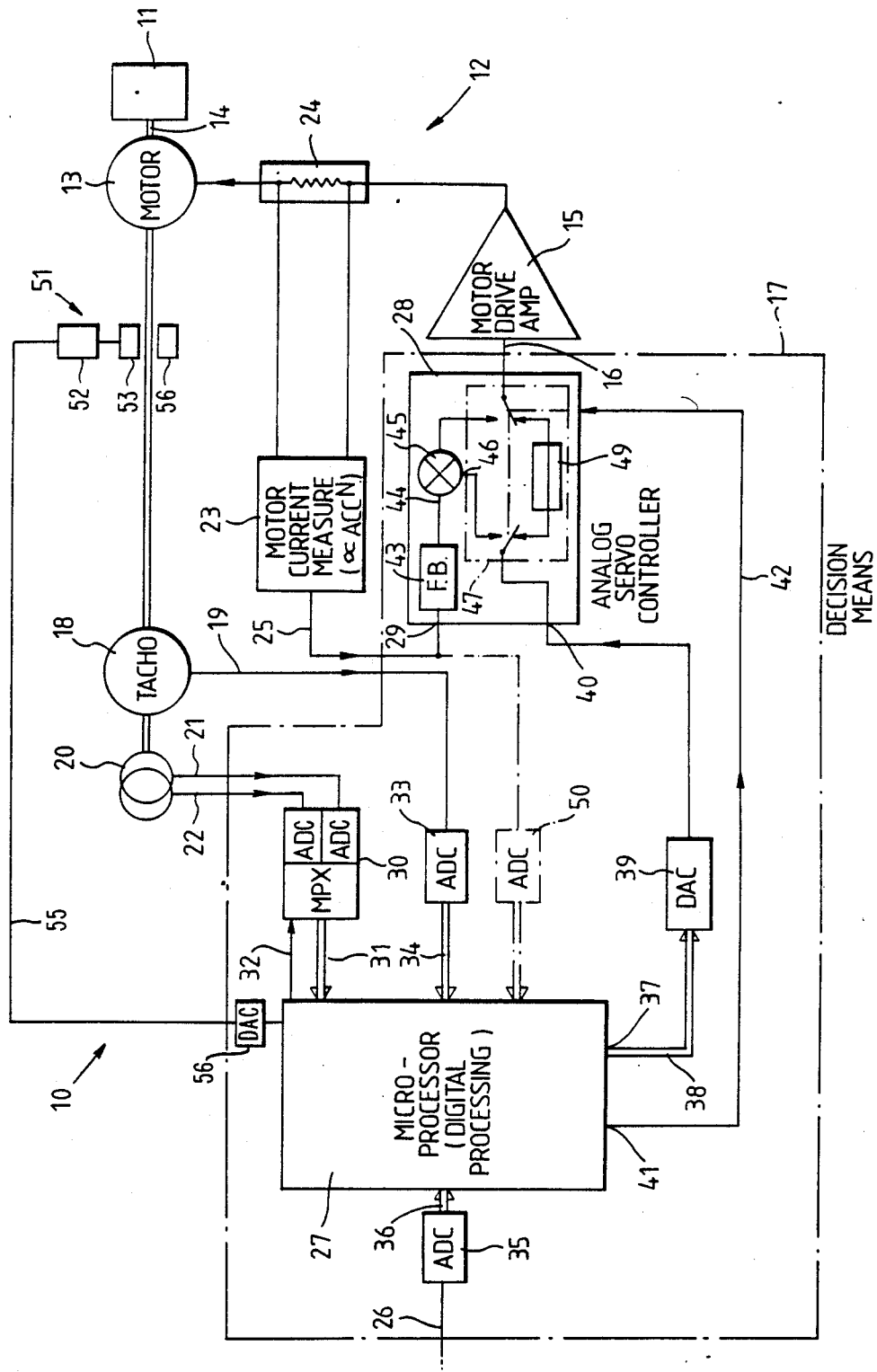

SERVO POSITIONING SYSTEM

This invention relates to servo positioning systems and in particular to feedback servo positioning systems operable to move the position of a body over a wide range of displacements with a rapid response.

It is known to configure feedback servo positioning systems with a feedback element having a transfer function which is not only linearly related to the position of a body but also to the velocity of motion. One critical factor determining the transfer functions employed is the stability of systems resulting therefrom.

Where the system is required to respond rapidly to reposition the body in a minimum time, then for small displacements the system may be slightly underdamped leading to a rapid motion between positions with only a short settling time at the new position. For large displacements an underdamped system may have a settling time which more than offsets any extra rate of movement or even become unstable, whereas a greater damping factor to avoid this can often result in overdamping and slower responses at lower displacements.

It is an object of the present invention to provide a method of rapid servo positioning and apparatus for feedback servo positioning operable rapidly over a wider range of displacements than hitherto.

According to a first aspect of the present invention a feedback servo positioning system for controlling the position of a displaceable body in accordance with received position demand signals includes transducer means operable to produce transducer signals representing the instantaneous position, velocity and acceleration of the body and drive motor means operable to displace the body in response to error signals received from decision making means to which said position demand signals and transducer signals are applied, said decision making means being responsive to a displacement between instantaneous and demanded positions greater than a predetermined threshold value to determine as a preset function of the demanded displacement an intermediate position and cause an error signal to be applied to the drive motor means to accelerate it at a predetermined acceleration rate until it reaches the intermediate position, thereafter causing the current to be reversed to decelerate the motor and reduced in value at a rate being a function of the instantaneous velocity and displacement to bring the body to rest at the demanded position, and responsive to a displacement between instantaneous and demanded positions less than said predetermined threshold value to cause the application of error signals to the drive motor means having a value proportional to the difference between the instantaneous and demanded positions.

According to a second aspect of the present invention a method of positioning a displaceable body in a feedback servo controlled positioning system including a drive motor responsive to received error signals to displace the body and transducer means operable to determine the instantaneous position, velocity and acceleration of the body and decision making means operable to apply signals to drive the motor as a logical function of a position demanded of the body, comprises determining whether a demanded position results in a demanded body displacement in excess of a predetermined threshold and if so, deriving an intermediate position as a preset function of the displacement between initial and demanded positions, causing a predetermined acceleration of the drive motor until the body reaches said intermediate position and from said intermediate position causing deceleration of the drive motor as a function of the instantaneous velocity and remaining displacement at a rate to bring the body to rest at the demanded position, and if or when the displacement between instantaneous and demanded positions is less than said predetermined threshold causing a substantially linear position error signal to be applied to the drive motor proportional to the difference between instantaneous and demanded positions.

An embodiment of the invention will now be described by way of example with reference to the accompanying drawing, showing a schematic electromechanical circuit diagram of a feedback servo positioning system according to the present invention.

A servo positioning system is shown generally at 10 for controlling the rotational position of a body 11. Drive motor means 12 includes a d.c. torque motor 13 having a rotatable shaft 14 on which the body is carried, the motor being supplied with drive current by a motor drive amplifier 15 at a magnitude corresponding to the magnitude of an error signal received on output line 16 from decision making means 17.

The motor shaft 14 is also coupled to transducer means comprising a tachogenerator 18 which produces analog signals of magnitude proportional to the rotational rate, or velocity, of the motor shaft on line 19 and angle resolving means 20 which produces analog signals of magnitude proportional to the rotational position of the motor shaft. The angle resolving means may in fact comprise a high accuracy synchro with dual windings giving, speed (coarse, low accuracy) and 36 speed (fine, high accuracy) outputs on line 21, 22. A motor current measuring transducer 23 comprises a current sensing resistance element 24 in the motor supply circuit from motor drive amplifier 15 and a voltage measuring device, such as a differential input voltage amplifier, to deliver on line 25 a signal voltage having a magnitude proportional to the drive current supplied to the motor 13 and thus the torque developed by, and acceleration of, the motor.

The output from the transducers 18, 20 and 23 are all applied as inputs to the decision making means, as is a position demand signal on line 26.

The decision making means 17 includes digital processing means in the form of a microprocessor 27 and analog servo controller means 28.

The signals from acceleration transducer 23 are applied to a first input 29 of the analog servo controller.

The signals from angle resolver 20 are fed on lines 21, 22 to separate channels of a multiplexer/analog-to-digital converter (ADC) 30. The multiplexer/ADC produces digitised motor shaft angle signals on bus 31 connected to an input port of the microprocessor, multiplexing signals for switching between channels being provided on a line 32 from the microprocessor.

The signals from tachogenerator 18 on line 19 are fed to an ADC 33 and thence to an input port of the microprocessor on bus 34.

The position demand signal on line 26 is applied to an ADC 35 and to an input port of the microprocessor on bus 36.

An output port 37 of the microprocessor is coupled by bus 38 to a digital-to-analog converter (DAC) 39, which provides the microprocessor output signals in analog form to a second input 40 of the analog servo controller and an output 41 provides configuration switching signals on line 42 to the analog servo controller whereby its transfer function characteristics are defined as described below.

The analog servo controller contains a feedback network having a transfer function to suitably modify acceleration signals as to amplitude and phase in accordance with known practices, said feedback network being connected to receive signals from the first input terminal 29 and provide them to one input 44 of error measuring means 45, the other input 46 of which is connected to receive signals from the second input terminal 40 by way of switching means 47. The error measuring means 44, conveniently a differencing circuit, has an output 48 connected by way of the switching means 47 to the decision making means output 16 and thence to the input of motor drive amplifier.

The switching means is shown schematically as a double-pole double-throw switch, in one switch state connecting the second input and the output terminals 40 and 16 to the above described input and output terminals 46 and 48 of the error measuring means and in the other state connecting the second input and the output terminals 40 and 16 to each other directly or by way of a circuit 49 having a constant, i.e. invarient, transfer function such as an amplifier or attenuator.

The state of the switching means 47 is set by configuration signals from the microprocessor in accordance with the microprocessor assuming one of two output states, which states also determine the nature of signals output from port 37.

The microprocessor is conventional in having storage means containing both the operating sequence of processing the various input signals and various preset values associated with the signals which cause changes in the operating sequence. The precise nature of the instructions for performing the operating sequence depends on the type of microprocessor employed but as such detail description is not essential to an understanding of the invention only the functional requirements of the programmed microprocessor are given here.

The general operating scheme, to be undertaken by the system is as follows. For any angular position of the body 11 when a new position is demanded the displacement between them is ascertained by the microprocessor and compared therein with a predetermined threshold value. If it is below the threshold the microprocessor assumes a simple position servo mode, the output signals at port 37 representing the difference between the demanded angular position and instantaneous angular position measured by transducer 20, that is, a position error signal, and the configuration signal at output port 41 putting the switching means 47 in the analog sevo controller to the state shown whereby the controller is configured essentially with a transfer function which is a constant.

The position error signals in analog form are applied to, and transmitted by, the analog servo controller and applied to the motor drive amplifier 15 which supplies current to the motor 13 of magnitude proportional to that of the error signal. Rotation of the motor reduces the angle signals from transducer 20 and in the microprocessor the position error signal is updated and again output to port 37.

The operation is thus that of a conventional position feedback servo but with the determination of error between demanded and instantaneous angular position signals being performed digitally by the microprocessor.

It will be appreciated that if desired the angle feedback signal may be modified as to phase in a lead or lag function by means of the velocity feedback signals on line 19 and input via ADC 33 and possibly by acceleration feedback signals on line 25 input via an ADC 50.

Returning to the initial comparison between the position error signal and the predetermined threshold, if the threshold is exceeded the microprocesser enters a 'fast slew' mode.

In this mode the output port 37 delivers a signal which represents an acceleration demand signal and the port 41 delivers a configuration signal which puts switching means 47 into the state with the contacts shown open in FIG. 2, closed.

The analog servo controller is thus configured as an acceleration feedback servo, the motor acceleration feedback signal being compared with the acceleration demand signal in analog form in error measuring means 45 and the acceleration error signal applied to the motor drive amplifier 15, the motor 13 thereby being accelerated at a rate determined by the acceleration demand signal from the microprocesor.

The value of demanded acceleration may be stored as a preset in the microprocessor determined from a knowledge of the motor performance and load. Conveniently such a preset value is the maximum acceleration rate of the motor or slightly less to avoid the motor drive amplifier becoming saturated.

If a maximum value of acceleration is required then this may in fact be determined by the microprocessor as a result of driving the amplifier 15 into saturation briefly and measuring the actual maximum acceleration (current) obtained.

Alternatively the value of demanded acceleration may be computed by the microprocessor from the instantaneous position and velocity of the motor using the angular position and velocity feedback signals.

In one example of operation in the fast slew mode the microprocessor selects a preset acceleration demand substantially equal to the motor maximum. It monitors the instantaneous position of the motor and compares this with a function of the demanded displacement. When this comparison indicates that the motor is at an intermediate position, say half way to the demanded position, the acceleration demand signal is reversed in polarity causing the motor to decelerate. The magnitude of the acceleration (deceleration) demand signal is reduced as a function of the feedback velocity and displacement. The function is that applicable to moving bodies and of the form acceleration $= -\omega^2/(2\cdot\epsilon)$ where $\omega$ is the instantaneous rotational velocity and $\epsilon$ is the remaining displacement error between the instantaneous and demanded positions.

The computed demanded deceleration rate ensures that the body is brought to rest at the demanded position. Whereas with an intermediate position half way to the demanded position and with a constant acceleration the body should theoretically be brought to rest at the demanded position it will be appreciated that external influences, internal friction and losses or errors in the measurement devices or processing delays will cause assymetry making such a controlled deceleration preferable.

It will be appreciated that the intermediate position may be other than half way requiring deceleration over a longer or shorter period. Clearly if it is greater than half way then the acceleration value must be less than the maximum in order for it to be increased for the corresponding shorter deceleration time.

In such event the system may be provided with mechanical braking means shown at 51 which includes an actuator 52 and brake shoes 53, 54 which are brought to bear on the motor shaft when the actuator received energizing signals on line 55 from the microprocessor via DAC 56. The microprocessor may store a representation of the maximum current available from the motor drive amplifier, or such maximum current may be determined from the monitored signal provided by ADC 50 as described above, and compare this with the demanded drive current represented by the deceleration demand signal output at port 37. If the deceleration demand exceeds that available from the motor drive amplifier a signal is produced on the line 55 to actuate the braking means and effect additional retardation of the motor until the motor current as measured by the acceleration feedback transducer 23 is within the limits of control and usable in determining an acceleration demand signal.

It will be appreciated that as the microprocessor is able to monitor the instantaneous angular position and the demanded position which indicated the 'fast slew' mode it is also able to determine when the decelerating motor produces an angular position error below the threshold value and may then switch to operate in the position servo mode for final positioning of the motor to the demanded position.

It will be appreciated that whereas the feedback signals are derived from individual transducers for each of the three quantities measurements of only one or two may be made, the other or others being derived by single and/or double integration and/or differentiation as appropriate.

In the decision making means 17 the digital processing means is conveniently in the form of a microprocessor as described above. The digital processing means may, of course, be implemented in other forms, such as conventional hard-wired logic circuitry.

I claim:

1. A feedback servo positioning system for controlling the position of a displaceable body in accordance with received position demand signals representing the instantaneous position, velocity and acceleration of the body, drive motor means for displacing the body by current flow therein resulting from servo error signals and decision making means operable to provide said servo error signals to the drive motor in response to said position demand and transducer signals, said decision making means being responsive to a measured displacement between instantaneous and demanded positions less than a predetermined threshold value to configure the feedback servo system as a position feedback loop and derive servo error signals having values proportional to the difference between the instantaneous and demanded positions, and responsive to a displacement between instantaneous and demanded positions greater than said predetermined threshold value to configure the feedback servo system as an acceleration feedback loop, provide an acceleration demand signal representing the achievement of a predetermined acceleration by the drive motor means, determine an intermediate position as a present function of the demanded displacement, determine an acceleration error between the acceleration demand signal and transducer signal representing the instantaneous acceleration, cause the acceleration error signal to apply a drive current to the drive motor to accelerate it at said predetermined acceleration rate until it reaches the intermediate position thereafter causing the current in the drive motor to be reversed in direction to effect controlled deceleration of the drive motor and reduce the acceleration demand signal as a function of the instantaneous velocity and displacement to bring the body to rest at the demanded position.

2. A feedback servo positioning system for controlling the position of a displaceable body in accordance with received position demand signals including transducer means operable to produce transducer signals representing the instantaneous position, velocity and acceleration of the body and drive motor means operable to displace the body in response to error signals received from decision making means to which said position demand signals and transducer signals are applied, said decision making means being responsive to a displacement between instantaneous and demanded positions greater than a predetermined threshold value to determine as a preset function of the demanded displacement an intermediate position and cause an error signal to be applied to the drive motor to accelerate it at a predetermined acceleration rate until it reaches the intermediate position, thereafter causing the current to be reversed to decelerate the motor and reduced in value at a rate being a function of the instantaneous velocity and displacement to bring the body to rest at the demanded position, and responsive to a displacement between instantaneous and demanded positions less than said predetermined threshold value to cause the application of error signals to the drive motor means having a value proportional to the difference between the instantaneous and demanded positions, said decision making means including (i) digital processing means containing the predetermined threshold value of displacement and the functions of displacement and velocity required to determine the intermediate position and deceleration rate, said digital processing means being arranged to receive signals relating to the demanded position and, from the transducer means, signals relating to the instantaneous position and velocity and operaable to produce in either a displacement output state signals representing the instantaneous displacement error or in an acceleration output state signals representing a demanded acceleration and to produce a configuration signal indicative of the output state, and (ii) analog servo controller means having
 (a) a first input arranged to receive thereat signals from the transducer means relating to instantaneous acceleration,
 (b) a second input arranged to receive thereat said signals from the digital processing means,
 (c) error measuring means,
 (d) a feedback network having a transfer function in accordance with acceleration signals arranged to pass the signals received at the first input to the error measuring means, and
 (e) switching means responsive to configuration signals from the digital processing means either to connect the second input, in receipt of acceleration demand signals, to the error measuring means and an output of the error measuring means to an output of the decision making means or to connect the second input, in receipt of position error signals, by way of a path having only a constant transfer function to said output of the decision making means.

3. A feedback servo positioning system as claimed in claim 1 in which the predetermined acceleration rate demanded is substantially constant.

4. A feedback servo positioning system as claimed in claim 2 in which the predetermined acceleration rate demanded represents substantially the maximum acceleration rate of the servo system.

5. A feedback servo positioning system as claimed in claim 1 in which the preset function of the demanded displacement between the demanded position and instantaneous position at the time of said determination of the intermediate position is a fraction thereof.

6. A feedback servo positioning system as claimed in claim 5 in which the fraction is one-half.

7. A feedback servo positioning system as claimed in claim 1 in which the deceleration rate function is the relationship of one half of the quotient of the square of the instantaneous velocity and the difference between the demanded and instantaneous positions at the time of determination.

8. A feedback servo positioning system as claimed in claim 1 including braking means responsive to a demanded drive motor deceleration rate function in excess of that available from the motor drive means to provide the additional retardation by mechanical braking of the body or drive motor means.

9. A method of positioning a body displaceable by a drive motor in response to received error signals and coupled to transducer means operable to measure the instantaneous position, velocity and acceleration of the body comprising determining whether a demanded position results in a demanded body displacement in excess of a predetermined threshold and if so, deriving an intermediate position as a preset function of the displacement between initial and demanded positions, causing a predetermined acceleration of the drive motor until the body reaches said intermediate position and from said intermediate position causing deceleration of the drive motor as a function of the instantaneous velocity and remaining displacement at a rate to bring the body to rest at the demanded position, and if or when the displacement between instantaneous and demanded positions is less than said predetermined threshold causing a substantially linear position error signal to be applied to the drive motor proportional to the difference between instantaneous and demanded positions.

10. A method as claimed in claim 9 in which the preset function of the demanded displacement between the demanded position and instantaneous position at the time of said determination of the intermediate position is a fraction thereof.

11. A method as claimed in claim 10 in which the fraction is one-half.

12. A method as claimed in claim 9 in which the deceleration rate function is the relationship of one half of the quotient of the square of the instantaneous velocity and the difference between the demanded and instantaneous positions at the time of determination.

13. A method as claimed in claim 9 in which the predetermined acceleration rate demanded is substantially constant.

* * * * *

UNITED STATES PATENT AND TRADEMARK OFFICE
CERTIFICATE OF CORRECTION

PATENT NO. : 4,694,229

DATED : September 15, 1987

INVENTOR(S) : Robert J. Cormack

It is certified that error appears in the above-identified patent and that said Letters Patent is hereby corrected as shown below:

Column 5, Claim 1, Line 3, after signals, please insert the following --including transducer means operable to produce transducer signals--.

Signed and Sealed this

Second Day of February, 1988

Attest:

DONALD J. QUIGG

Attesting Officer

Commissioner of Patents and Trademarks